United States Patent
Matei et al.

(10) Patent No.: US 11,264,900 B2
(45) Date of Patent: Mar. 1, 2022

(54) PFM CONTROL METHOD FOR BOOST CONVERTERS

(71) Applicant: Apple Inc., Cupertino, CA (US)

(72) Inventors: Bogdan-Eugen Matei, Munich (DE); Alessandro Molari, Munich (DE); Fabio Ongaro, Munich (DE); Giovanni Saccomanno, Munich (DE); Hao Zhou, San Jose, CA (US)

(73) Assignee: Apple Inc, Cupertino, CA (US)

(*) Notice: Subject to any disclaimer, the term of this patent is extended or adjusted under 35 U.S.C. 154(b) by 175 days.

(21) Appl. No.: 16/793,516

(22) Filed: Feb. 18, 2020

(65) Prior Publication Data
US 2021/0257911 A1 Aug. 19, 2021

(51) Int. Cl.
*H02M 3/158* (2006.01)
*H02M 1/00* (2006.01)
*H02M 3/156* (2006.01)

(52) U.S. Cl.
CPC ......... *H02M 3/158* (2013.01); *H02M 1/0035* (2021.05); *H02M 1/0054* (2021.05); *H02M 3/156* (2013.01); *H02M 1/0032* (2021.05)

(58) Field of Classification Search
CPC ............ H02M 1/0025; H02M 1/0032; H02M 1/0035; H02M 1/0048; H02M 1/0054; H02M 3/156; H02M 3/158
See application file for complete search history.

(56) References Cited

U.S. PATENT DOCUMENTS

| | | | |
|---|---|---|---|
| 8,901,908 B2 | 12/2014 | Tang et al. | |
| 9,093,899 B2 | 7/2015 | Jayaraj et al. | |
| 9,337,726 B2 | 5/2016 | Lalithambika et al. | |
| 9,484,816 B2 | 11/2016 | Tschirhart et al. | |
| 9,584,019 B2* | 2/2017 | Shiwaya | H02M 3/158 |
| 2018/0019679 A1* | 1/2018 | Yang | H02M 3/33507 |
| 2021/0218343 A1* | 7/2021 | Matei | H02M 3/158 |
| 2021/0226536 A1* | 7/2021 | Couleur | H02M 1/0025 |

FOREIGN PATENT DOCUMENTS

KR 20110129653 * 12/2011 ............ H02M 3/158

* cited by examiner

*Primary Examiner* — Matthew V Nguyen
(74) *Attorney, Agent, or Firm* — Kowert, Hood, Munyon, Rankin & Goetzel, P.C.; Erik A. Heter (57) ABSTRACT

The present disclosure is directed to a pulse frequency modulation (PFM) control method for a boost converter and apparatus for carrying out the method. A boost converter includes an inductor and a transistor coupled thereto. A control circuit is arranged to control the transistor to cause current pulsed to be sourced through the inductor. When operating in a PFM mode, the control circuit may control the timing of pulses such that, at the beginning of a specified time period, current pulses may be sourced with no spacing between successive pulses. After a desired number of pulses have been sourced, no pulses are sourced for the remainder of the specified time period. Nevertheless, the number of pulses sourced over the time period corresponds to a desired average frequency of pulses.

20 Claims, 5 Drawing Sheets

PFM CONTROL METHOD FOR BOOST CONVERTERS

BACKGROUND

Technical Field

This disclosure is directed to electronic circuits, and more particularly, to DC-DC converters.

Description of the Related Art

Computing systems may include one or more systems-on-a-chip (SoC), each of which may integrate a number of different functions onto a single integrated circuit. Various SoCs and/or various functional blocks on a given SoC may utilize power signals of different voltage levels. Since computing systems may include a single power source with a given output voltage level, one or more voltage converters or voltage regulators may be used to generate the power signals of different voltage levels.

Voltage regulation circuits implemented in a given computing system may be designed according to one of various design styles and types. Types of circuits for converting a DC power signal with a first voltage to a DC power signal with a second voltage include linear regulators and switching regulators. Boost converters, sometimes also referred to as boost regulators, are one example of a switching regulator. Boost converter provide an output voltage that is greater than the input voltage, in contrast to bucks converters, which step down the input voltage.

SUMMARY

The present disclosure is directed to a pulse frequency modulation (PFM) control method for a boost converter and apparatus for carrying out the method. In one embodiment, a boost converter includes an inductor and a transistor coupled thereto. A control circuit is arranged to control the transistor to cause current pulsed to be sourced through the inductor. When operating in a PFM mode, the control circuit may control the timing of pulses such that, at the beginning of a specified time period, current pulses may be sourced with no spacing between successive pulses. After a desired number of pulses have been sourced, no pulses are sourced for the remainder of the specified time period. Nevertheless, the number of pulses sourced over the time period corresponds to a desired average frequency of pulses.

In one embodiment, a method for operating a boost converter in a PFM mode includes, at the beginning of a specified time period, sourcing a current pulse through an inductor of the boost converter. Thereafter, one or more additional pulses are sourced, with no delay between successive pulses. After a desired number of pulses have been sourced within the specified time period, no further pulses are sourced for the remainder of the same. Nevertheless, the number of pulses sourced within the specified time period will still yield an average frequency of pulses that corresponds to a frequency of pulses if they were evenly spaced across the specified time period.

BRIEF DESCRIPTION OF THE DRAWINGS

The following detailed description makes reference to the accompanying drawings, which are now briefly described.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

The present disclosure is directed to a DC-DC converter and a method for operating the same, particularly in a PFM mode. Many boost converters can operate in a PFM mode when load current demand is low. When load current demand is high, boost converters may operate in a pulse width modulation (PWM) mode, in which the pulses are longer.

Conversion efficiency is an important parameter in boost converters, particularly in battery-powered applications. In various embodiments of a boost converter, an inductor is coupled to a switching device (e.g., a transistor) at a switching node. Current pulses through the inductor can be controlled by activating and deactivating the transistor. However, when the transistor is deactivated, there can be ringing on the switching node, both in terms of its voltage and the current through the inductor. When the pulses are evenly spaced apart from one another, as during operation in a PFM mode in conventional boost converters, this ringing can occur every time the transistor is deactivated. The ringing can cause power losses, and thus reduce the efficiency of the boost converter. The power loss may be based on a parasitic capacitance existing between the switching node and ground. More particularly, the power loss can be expressed by the following:

$$P_{CLx} = (0.5 * C_{Lx} * V_{CLx}^2) f_{PFM},$$

where $P_{CLx}$ is power loss, $C_{Lx}$ is the parasitic capacitance, $V_{CLx}$ is the voltage across the parasitic capacitance, and $f_{PFM}$ is the PFM switching frequency.

In addition to the above, another aspect of the problem occurs when the load current is increasing, and correspondingly, the PFM switching frequency. This may occur when the transistor is activated while ringing is occurring on the switching node and could coincide with one of the voltage peaks caused by such ringing. As such, the voltage difference across the parasitic capacitance (existing between the switching node and ground) will be greater, and may be higher even than the input voltage provided to the boost converter. The ringing on the switching node may be caused by an LC tank circuit that exists due in part to the presence of the parasitic capacitance. Some attenuation of the ringing may be caused by the DC resistance through the inductor. However, as the tank circuit oscillates, the remaining energy in the LC tank is transferred from the inductor to the parasitic capacitance. Turning on the power switch when the voltage across the parasitic capacitance is at a peak results in dissipation of the LC tank energy across the ON resistance of the transistor. Accordingly, most of the LC tank energy may be lost instead of being transferred back to the input voltage source.

The boost converter of the present disclosure implements a control method that reduces the efficiency loss due to ringing. Instead of evenly spacing current pulses over a specified time period, the boost converter of the present disclosure sources the current pulses toward the beginning of the period. After a number of pulses have been sourced to obtain a desired average frequency of pulses for the specified time period, no pulses are sourced for the remainder of the period. By sourcing a next pulse immediately following the most recent previously sourced pulse, little or no ringing occurs on the switching node. Thus, any ringing on the switching node may be limited to occurring after the final current pulse is sourced for a specified time period. Therefore, instead of ringing occurring after every pulse (as may occur when the pulses are evenly spaced), ringing only occurs after the last pulse of the period. This may in turn reduce the wasted power that would otherwise occur if the pulses were evenly spaced over a specified time period. In one embodiment, the power savings may be expressed by the following equation:

$$P_{SAVE} = (0.5 * CLx * V_{CLx}^2) * f_{PFM} * (N_{CONSEC\_PULSES} - 2) / (N_{CONSEC\_PULSES} - 1),$$

where $N_{CONSEC\_PULSES}$ is the number of consecutive (e.g., without delay there between) current pulses sourced in the specified time period, and $V_{CLx}$ represents a voltage (e.g., a peak voltage) on the switching node due to ringing. Despite the fact that the pulses occur toward the beginning of the specified time period, the desired average frequency of pulses may be maintained since the number of pulses within the specified time period is the same as if they were evenly spaced.

While the various embodiments of the methodology operation disclosed herein are discussed in the context of being performed in boost converters, it is possible and contemplated that buck converters may be implemented that perform the same or similar operation. Accordingly, such buck converters may fall within the scope of this disclosure.

Figure 1:
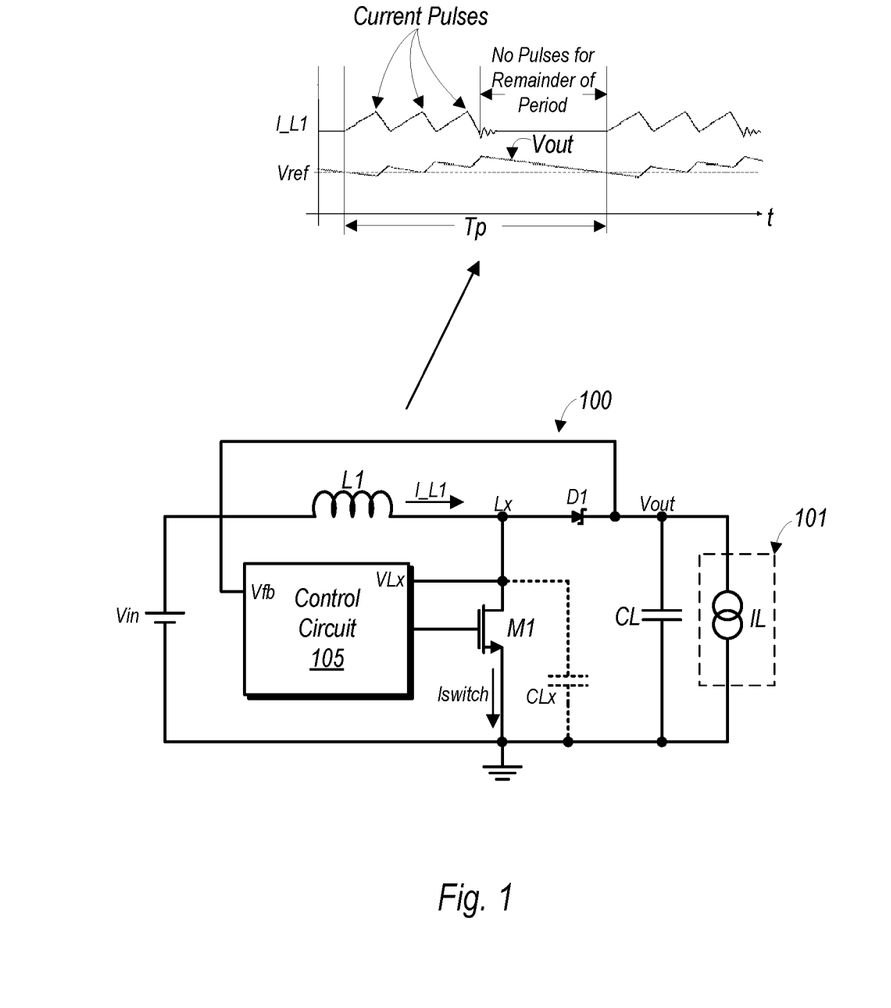
FIG. 1 is a schematic diagram of one embodiment of a boost converter.

Turning now to FIG. 1, a schematic diagram of one embodiment of a boost converter is shown. In the embodiment shown, boost converter 100 is coupled to provide a supply voltage, Vout, to load circuit 101. A load capacitance, CL, is coupled between the output and ground nodes. Load circuit 101 is represented here by a load capacitance a load current IL, which can vary over time during operation. In practice, load circuit 101 can be any type of circuitry suitable for receiving a supply voltage from a boost converter, and can include various types of analog, digital, and/or mixed signal circuitry. Accordingly, the representation using a current source is not meant to be limiting.

Boost converter 100 in the embodiment shown is coupled to receive an input voltage Vin (e.g., from a battery or other source). The output voltage, Vout, is provided at a value that is greater than the input voltage, Vin. An inductor L1 is coupled to the voltage source Vin at one terminal, and coupled to a switching voltage node Lx at the other terminal. The switching node Lx is coupled to an anode of diode D1 (which may be a Schottky diode in this embodiment), while the cathode of D1 is coupled to the output voltage node, Vout. Transistor M1 includes a drain terminal that is also coupled to voltage node Lx. When transistor M1 is active, a current path for the current Iswitch is created, and the voltage on node Lx may be pulled toward ground. When transistor M1 is inactive, the voltage on Lx may rise while inductor L1 may begin storing energy. It is through the activation and deactivation of M1 that current pulses are sourced through inductor L1.

In the embodiment shown, a capacitance CLx is in parallel with transistor M1 between the switching node Lx and ground. This capacitance is a parasitic capacitance, and does not represent the presence of an actual capacitor in the embodiment shown. Nevertheless, this parasitic capacitance may cause the ringing on the switching node Lx, when operating in the PFM mode, as discussed above. However, the energy and efficiency losses resulting from this ringing may be mitigated by the manner in which current pulses are sourced.

Control circuit 105 in the embodiment shown is coupled to a gate terminal of M1, and thus controls the on/off switching of this device. First and second feedback voltages may be provided to control circuit 105. The first feedback voltage, Vfb, is equivalent to the output voltage in this embodiment. However, it is noted that embodiments are possible and contemplated in which this feedback voltage may be scaled, and thus embodiments having circuitry implemented between Vout and Vfb are considered to fall within the scope of this disclosure. The second feedback voltage provided to control circuit in this embodiment is VLx, which is the voltage on the switching node. Both of the feedback voltages may vary based on, and provide a basis for, switching M1 on and off.

Generally speaking, within a specified time period, control circuit 105 may activate and deactivate M1 such that the current pulses are sourced through inductor L1 at or toward the beginning of the period. The current pulses may be sourced such that there is little or no delay between one pulse and its immediate successor until all current pulses for the specified period have been sourced. The number of current pulses sourced in a specified period may be determined by control circuit 105 in accordance with a desired frequency of pulses. This frequency may be determined based on the feedback voltages, and thus, the current demands of load circuit 101. After a final pulse for the specified period has been sourced, no further pulses are sourced for the remainder of the period. However, even though the pulses are not evenly spaced through the specified period, the desired average frequency of pulses can be achieved/maintained since it is dependent primarily on the number of pulses within the period and not their spacing with respect to one another.

The manner in which control circuit 105 may mitigate the ringing problem discussed above is shown graphically in FIG. 1. As shown in the example, within the specified time period Tp, three current pulses (representative of the current through inductor L1, or I_L1) are sourced from the beginning of Tp, with no delay between the first and second pulses, nor any delay between the second and third pulses. After the third pulse, no additional current pulses are sourced for the remainder of the specified time period Tp. However, the average frequency of pulses for the period in this example is the same as if the three sourced current pulses had been evenly spaced over the this period. On the other hand, since the pulses are not spaced, the ringing on the switching occurs only after the last pulse is sourced. As shown in this example, ringing occurs in the inductor current, I_L1, after the last pulse is sourced, and this ringing corresponds to the voltage ringing on the switching node.

Since the ringing only occurs after the final pulse of the specified period, the wasted energy is minimized and thus the overall efficiency of boost converter 100 is increased for PFM mode operation. Furthermore, as shown in the illustration, the output voltage, Vout, dithers around the reference voltage, Vref, which is indicative of the desired output voltage.

Figure 2:
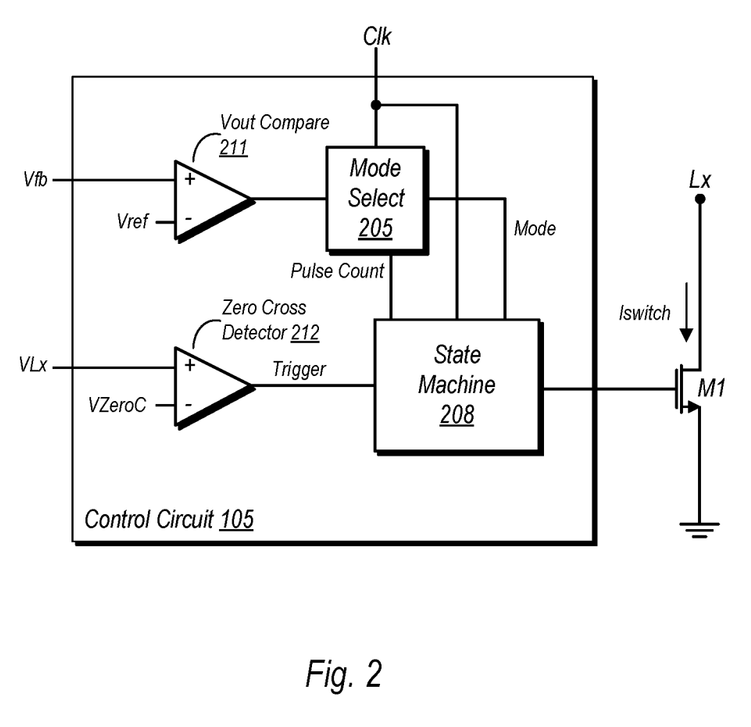
FIG. 2 is a block diagram illustrating one embodiment of a control circuit in a boost converter.

FIG. 2 is a block diagram illustrating one embodiment of a control circuit in a boost converter. In the embodiment shown, control circuit 105 includes a mode select circuit 205, a state machine 208, an output voltage comparator 211, and a zero crossing detector 212. Mode select circuit 205 and state machine 208 are each coupled to receive a clock signal in this particular embodiment. It is noted that this is a simplified diagram provided to illustrate the basic operation of control circuit 105 with respect to this disclosure, and may include additional or other components as well.

Mode select circuit 205 in the embodiment shown is may determine both the mode of operation of the boost converter (PFM or PWM), as well determining the average frequency during operations in the PFM mode. Determining the mode of operation, as well as the average frequency, may be at least partly based on the comparison between the feedback voltage and the reference voltage performed by output voltage comparator 211. As noted above in the discussion of FIG. 1, the feedback voltage Vfb is based on the output voltage of the boost converter Vout. More particularly, the feedback voltage input Vfb may be coupled directly to the output voltage node, or may be a scaled version of the output voltage, received from other circuitry, that corresponds to the output voltage. The reference voltage, Vref (generated by, e.g., a bandgap circuit), is indicative of a desired output voltage to be provided by the boost converter. Output voltage comparator 211 in the embodiment shown may output a high to mode select circuit 205 when the feedback voltage Vfb is greater than the reference voltage, Vref.

During operation of the boost converter, the output voltage may dither around a desired output voltage value, being greater than this value at times and less at other times (due to the switching operation). In the embodiment shown, mode select circuit 205 may determine a mode of operation (as indicated by the 'Mode' signal) for the boost converter (PWM or PFM). For PFM mode operation, mode select circuit may determine a desired average frequency of current pulses, and thus the number of current pulses to be sourced within a specified time period. This latter value may be provided to state machine 208 as a pulse count value (as indicated by the 'Pulse Count' signal). Although not explicitly shown or otherwise discussed here, mode select circuit 205 may provide other signals to state machine 208 for, e.g., PWM mode operation.

Generally speaking, the output voltage comparator may, over time, provide an indication of the current demanded by the load circuit, as this current demand has a direct effect on the output voltage. Higher current demands may result in operation in the PWM mode. Increasing current demand during PFM mode operation may result in an increasing number of current pulses to be sourced in order to maintain the desired output current, and thus the desired output voltage. Conversely, a very low or falling current demand may result in PFM mode operation with a smaller number of pulses sourced to maintain both the desired values of output voltage and load current.

State machine 208 in the embodiment shown controls the on/off switching of transistor M1 in accordance with the selected mode of operation. When operating in the PFM mode, state machine 208 may control the activation and deactivation of transistor M1, in accordance with the pulse count received from mode select circuit 205, to source the indicated number of current pulses, as well as in accordance with the trigger signal received from zero cross comparator 212. As shown, zero cross comparator 212 includes a first input coupled to receive the switching node voltage, VLx, and a second voltage, VZeroC, which is a reference voltage corresponding to a zero crossing point (and may also be generated by, e.g., a bandgap circuit). When the switching voltage VLx falls below the zero crossing reference voltage VZeroC, the trigger signal may be asserted. The assertion of the trigger signal may thus indicate that the most recent current pulse is complete. If the number of pulses sourced in the specified time period is less than the pulse count, state machine 208 may thus cause another pulse to be sourced. However, if the number of pulses sourced in the specified time period is equal to the number indicated by the pulse count, no further current pulses are sourced until the next specified time period.

Boost converter 100 may operate in two distinct phases with regard to transistor M1. When transistor M1 is active, a current path exist through the device, as shown by Iswitch. Accordingly, the current through the inductor will also increase. However, since current through an inductor cannot increase instantaneously, the current increase will occur with a slope such as that shown in the graphic illustrated in FIG. 1. As the current in the inductor increases, the inductor also generates a magnetic field and thus stores energy. When M1 is deactivated, the current path for Iswitch is thus cut off. Accordingly, the only remaining current path is through the diode and to the load circuit. Again, since current through an inductor cannot change instantaneously, the inductor will begin discharging current in a downslope, through the diode, and to the load circuit, and will continue until either fully discharging or until transistor M1 is activated again. In this manner, current pulses are sourced by the activation and deactivation of transistor M1.

It is noted that the voltage across an inductor can change instantaneously, so the deactivation of M1 thus causes the switching node voltage to rise to a value that is greater than that of Vin. This in turn causes the higher voltage on the switching node to be transferred across the diode, thereby charging the load capacitance and thus enabling the boost converter to provide an average output voltage that is greater than the input voltage.

Figure 3:
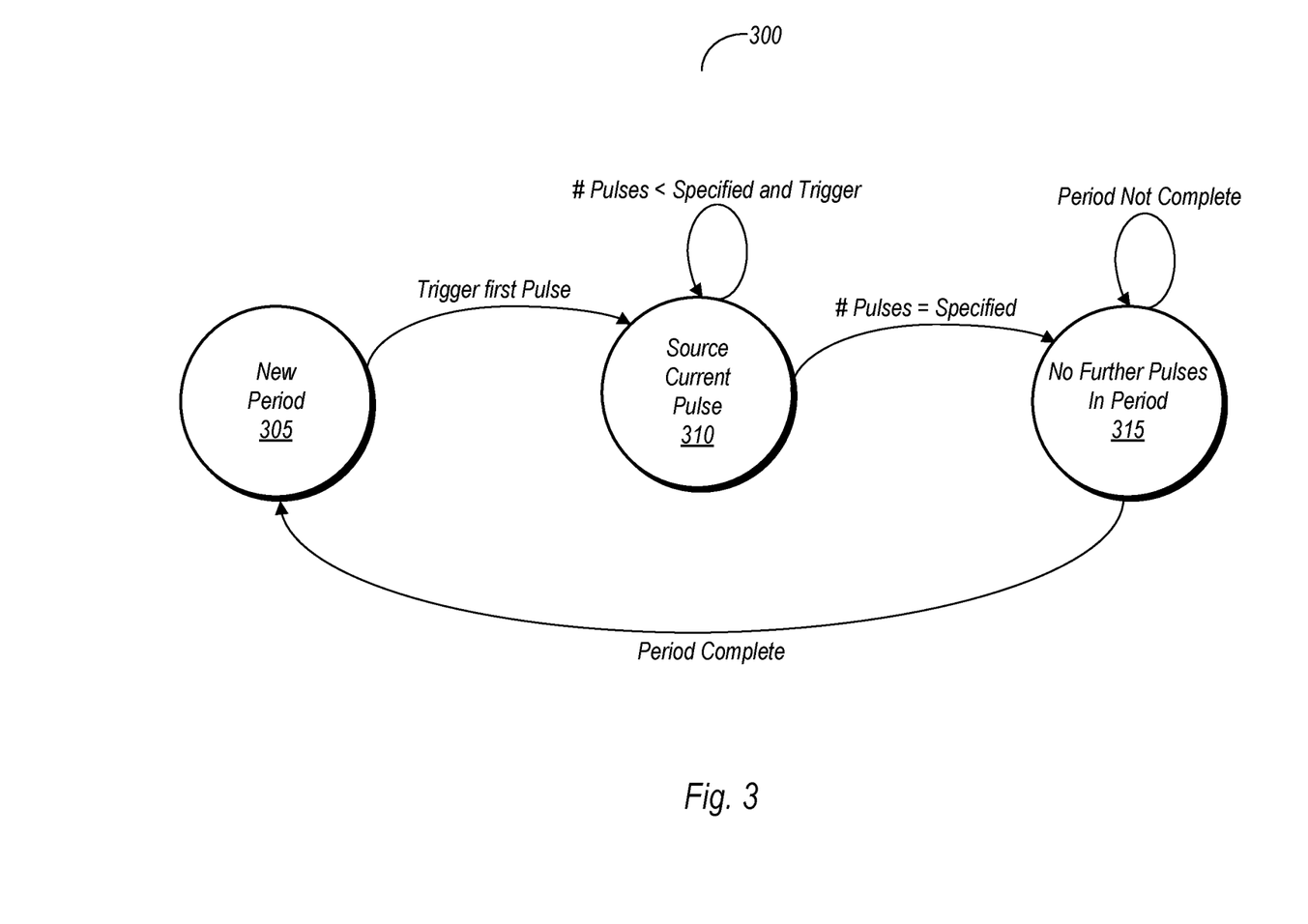
FIG. 3 is a state diagram illustrating operation of one embodiment of a state machine in a boost converter during PFM mode operation.

FIG. 3 is a state diagram illustrating operation of one embodiment of a state machine in a boost converter during PFM mode operation. It is noted that this diagram applies only to the PFM mode, and thus does not apply to PWM mode operation. Thus, when in the PWM mode, state machine 208 may operate differently than shown in state diagram 300.

State diagram 300 begins with operation in a new period, state 305. Upon entry into the new period, the trigger signal may be asserted by the zero crossing comparator 212 shown in FIG. 2. Accordingly, with the trigger signal asserted, the state diagram proceeds to state 310, sourcing a current pulse. When a current pulse is sourced, the trigger signal may be de-asserted. However, upon re-assertion of the trigger signal, another current pulse may be sourced if the number sourced thus far is less than the specified number of pulses (as specified by the pulse count provided to state machine 208 from mode select circuit 205). This process may repeat as long as the number of current pulses sourced is less than the number specified by the pulse count. However, once the number of pulses is equal to the number specified by the pulse count, state machine 208 proceeds to state 315, irrespective of the state of the trigger signal. Thereafter, state machine 208 will remain in state 315 as long as the specified period is not complete. Once the specified period is complete, state machine 208 returns to state 305, and begins the sourcing of current pulses for the new period.

Figure 4:
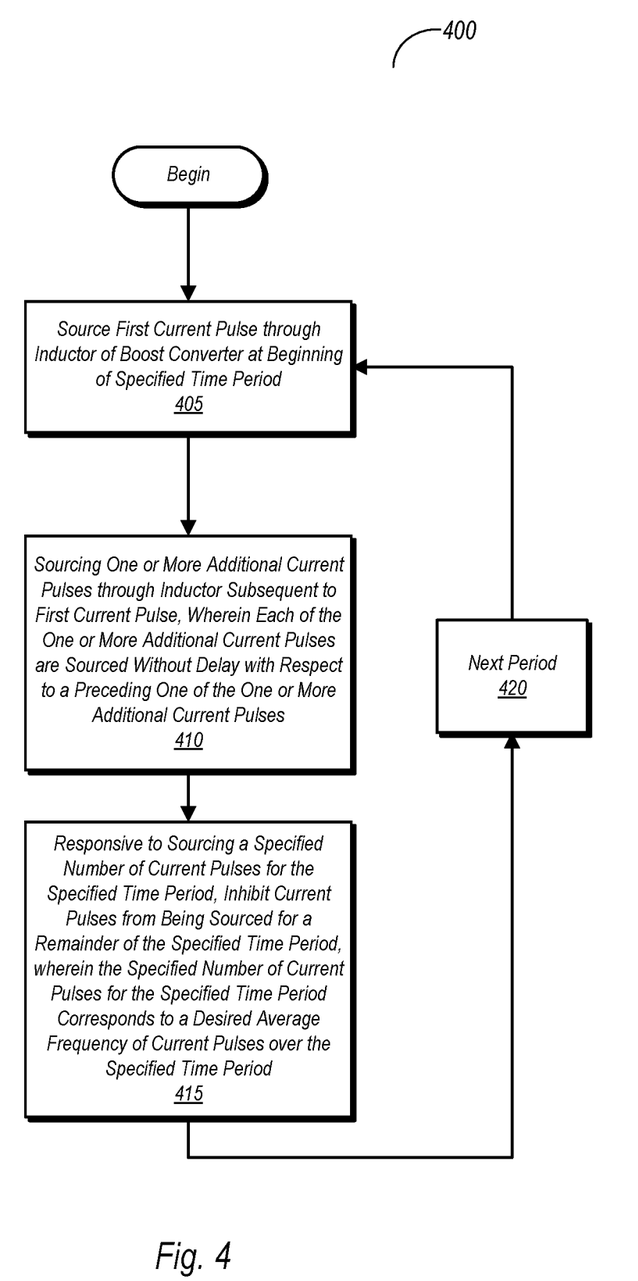
FIG. 4 is a flow diagram illustrating operation of one embodiment of a boost converter.

FIG. 4 is a flow diagram illustrating operation of one embodiment of a boost converter. Method 400 may be performed with various embodiments of the DC-DC converter discussed above as well as with other embodiments not explicitly discussed herein. Moreover, embodiments of a DC-DC converter not explicitly discussed herein but otherwise capable of carrying out method 400 may fall within the scope of this disclosure.

Method 400 includes sourcing a first current pulse through an inductor of a boost converter circuit at a beginning of a specified time period (block 405). Thereafter, the method includes sourcing one or more additional current pulses through the inductor subsequent to the first current pulse, wherein each of the one or more additional current pulses are sourced without delay with respect to a preceding one of the one or more additional current pulses (block 410). Responsive to sourcing a specified number of current pulses for the specified time period, inhibiting current pulses from being sourced for a remainder of the specified time period, wherein the specified number of current pulses for the specified time period corresponds to a desired average frequency of current pulses over the specified time period (block 415).

In various embodiments, sourcing the first current pulse and the one or more additional current pulses comprises operating the boost converter circuit in a pulse frequency modulation (PFM) mode. In sourcing the current pulses, the method includes a control circuit activating and de-activating a transistor to cause the first current pulse and the one or more current pulses to be sourced through the inductor, and the control circuit causing sourcing of a next one of the one or more current pulses responsive to detecting that the feedback voltage has fallen below a threshold voltage.

In various embodiments, the method includes the control circuit determining the desired average frequency based on desired output voltage to be provided by the boost converter. The method may also include the control circuit causing a current pulse to be sourced by de-activating a transistor coupled to the inductor and the control circuit discontinuing the current pulse by activating the transistor.

Figure 5:
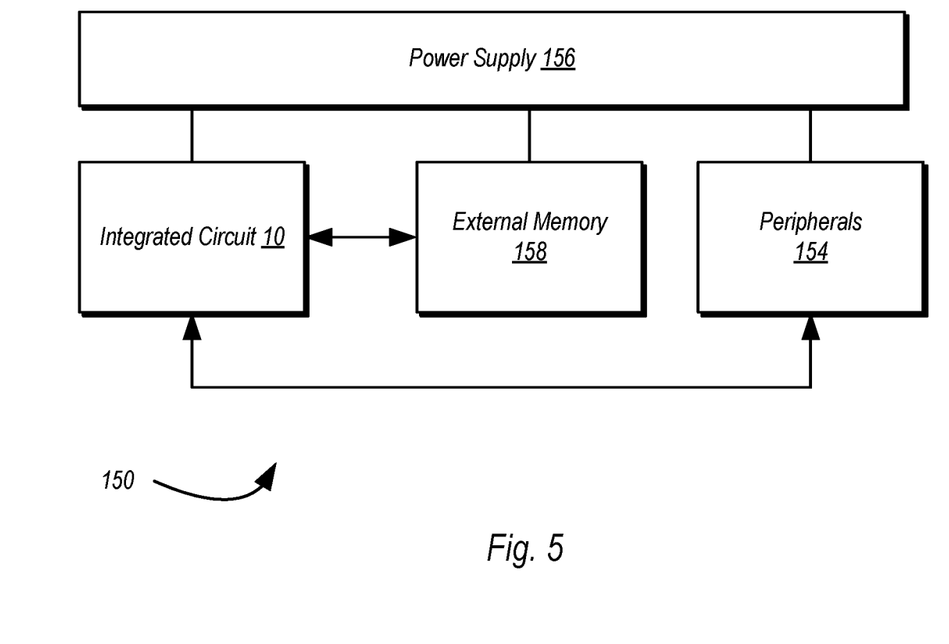
FIG. 5 is block diagram of one embodiment of an example system.

Turning next to FIG. 5, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

In various embodiments, one or more components of system 150 may include one or more instances of a DC-DC converter as discussed above. For example, peripherals 154 may include a display having a backlight that is powered by an embodiment of a DC-DC converter of the present disclosure. Other instances of the DC-DC converter disclosed herein may be implemented in, e.g., integrated circuit 10, among other places. Generally speaking the DC-DC converter of the disclosure may be utilized in any suitable application.

Numerous variations and modifications will become apparent to those skilled in the art once the above disclosure is fully appreciated. It is intended that the following claims be interpreted to embrace all such variations and modifications.

What is claimed is:

1. A circuit comprising:
   an inductor having a first terminal coupled to an input voltage node and a second terminal coupled to a switching node;
   a transistor having a drain terminal coupled to the switching node and a source terminal coupled to a ground node; and
   a control circuit configured to control the transistor to cause current pulses to be sourced through the inductor, wherein during operation in a pulse frequency modulation (PFM) mode, the control circuit is configured to, at a beginning of a specified time period, source a plurality of current pulses with no spacing between successive ones of the current pulses and inhibit current pulses from being sourced for a remainder of the specified time period, wherein a number of current pulses sourced is based on a desired average frequency of current pulses over the specified time period.

2. The circuit of claim 1, wherein the control circuit includes a state machine configured to determine the desired average frequency based on a feedback voltage.

3. The circuit of claim 1, wherein the control circuit is configured to determine number of current pulses to be sourced based on the desired average frequency.

4. The circuit of claim 1, wherein the control circuit includes a zero-crossing detection circuit configured to cause a next current pulse of the plurality of current pulses to be sourced responsive to detecting a feedback voltage falling below a threshold voltage.

5. The circuit of claim 4, wherein the feedback voltage is a voltage on the switching node.

6. The circuit of claim 1, wherein the control circuit is configured to cause a current pulse to be sourced by de-activating the transistor, and further configured to discontinue sourcing the current pulse by activating the transistor.

7. The circuit of claim 1, wherein the circuit comprises a boost converter configured to provide an output voltage on an output voltage node that is greater than an input voltage received on the input voltage node.

8. The circuit of claim 7 further comprising a voltage source coupled to provide the input voltage to the input voltage node.

9. The circuit of claim 7, further comprising a Schottky diode having an anode coupled to the switching node and a cathode coupled to the output voltage node.

10. A method comprising:
   sourcing a first current pulse through an inductor of a boost converter circuit at a beginning of a specified time period;
   sourcing one or more additional current pulses through the inductor subsequent to the first current pulse, wherein each of the one or more additional current pulses are sourced without delay with respect to a preceding one of the one or more additional current pulses;
   responsive to sourcing a specified number of current pulses for the specified time period, inhibiting current pulses from being sourced for a remainder of the specified time period, wherein the specified number of current pulses for the specified time period corresponds to a desired average frequency of current pulses over the specified time period.

11. The method of claim 10, wherein sourcing the first current pulse and the one or more additional current pulses comprises operating the boost converter circuit in a pulse frequency modulation (PFM) mode.

12. The method of claim 10, further comprising a control circuit activating and de-activating a transistor to cause the first current pulse and the one or more current pulses to be source through the inductor.

13. The method of claim 10, further comprising a control circuit causing sourcing of a next one of the one or more current pulses responsive to detecting that a feedback voltage has fallen below a threshold voltage.

14. The method of claim 10, further comprising a control circuit determining the desired average frequency based on desired output voltage to be provided by the boost converter.

15. The method of claim 10, further comprising:
   a control circuit causing a current pulse to be sourced by de-activating a transistor coupled to the inductor; and the control circuit discontinuing the current pulse by activating the transistor.

16. An apparatus comprising:
an input voltage source;
a load circuit; and
a boost converter coupled to receive an input voltage from the input voltage source and configured to provide an output voltage to the load circuit, wherein the output voltage is greater than the input voltage, and wherein the boost converter includes:
   an inductor having a first terminal coupled to the input voltage source;
   a transistor having a drain terminal coupled to a second terminal of the inductor and a source terminal coupled to a ground node; and
   a control circuit configured to control operation of the transistor to cause current pulses to be sourced through the inductor, wherein, when operating in a pulse frequency modulation (PFM) mode, the control circuit is configured to, at a beginning of a specified time period, cause a plurality of current pulses to be sourced without delay between successive ones of the plurality of current pulses, and inhibit current pulses from being sourced for a remainder of the specified time period responsive to having sourced a specified number of current pulses.

17. The apparatus of claim 16, wherein the control circuit is configured to source a number of current pulses within the specified time period based on a desired average frequency of current pulses over the specified time period.

18. The apparatus of claim 17, wherein the control circuit is configured to determine the desired average frequency of pulses based in part on a desired value of the output voltage.

19. The apparatus of claim 16, wherein the control circuit is configured to determine number of current pulses to be sourced based on a desired average frequency.

20. The apparatus of claim 16, wherein the control circuit includes a zero-crossing detection circuit configured to cause a next current pulse of the plurality of current pulses to be sourced responsive to detecting a feedback voltage falling below a threshold voltage.

* * * * *